United States Patent [19]

Gottemoller

[11] Patent Number: 5,425,338

[45] Date of Patent: Jun. 20, 1995

[54] RAILWAY LOCOMOTIVE DIESEL ENGINE SPEED/LOAD CONTROL DURING AIR STARVATION

[75] Inventor: Paul Gottemoller, Palos Park, Ill.

[73] Assignee: General Motors Corporation, Detroit, Mich.

[21] Appl. No.: 219,223

[22] Filed: Mar. 28, 1994

[51] Int. Cl.⁶ .............................................. F02D 31/00
[52] U.S. Cl. ...................................... 123/358; 123/357
[58] Field of Search ............... 123/319, 358, 320, 325, 123/332, 340, 357, 344, 681, 393, 672, 703, 501, 359, 373, 445; 290/3, 1 R

[56] References Cited

U.S. PATENT DOCUMENTS

| | | | |
|---|---|---|---|
| 2,402,725 | 6/1946 | Birkigt | 60/13 |
| 3,667,214 | 6/1972 | Addie | 60/13 |
| 4,423,713 | 1/1984 | Sami et al. | 123/357 |
| 4,445,337 | 5/1984 | McCreary | 60/608 |
| 4,475,507 | 10/1984 | Miyaki et al. | 123/357 |
| 4,498,437 | 2/1985 | Ohkoshi et al. | 123/373 |
| 4,502,437 | 3/1985 | Voss | 123/357 |
| 4,624,230 | 11/1986 | Grieshaber et al. | 123/445 |
| 4,711,211 | 12/1987 | Oshizawa et al. | 123/357 |
| 4,719,818 | 1/1988 | McCreary | 74/750 R |

Primary Examiner—Raymond A. Nelli
Attorney, Agent, or Firm—Charles K. Veenstra

[57] ABSTRACT

Methods of operating a locomotive engine to maintain power and speed under conditions of air starvation, as in high temperature tunnel operation, include varying engine load instead of fuel rate to maintain set engine speed when operating at (1) excessive engine exhaust smoke levels or (2) under conditions where increasing fuel rate fails to increase engine power. Normal speed control by varying fuel rate is maintained under other operating conditions. Application to turbocharged two cycle diesel engines is particularly indicated.

8 Claims, 2 Drawing Sheets

RAILWAY LOCOMOTIVE DIESEL ENGINE SPEED/LOAD CONTROL DURING AIR STARVATION

TECHNICAL FIELD

This invention relates to diesel engines in railway locomotives operating under conditions where the availability of intake air is limited, such as in some tunnel operations. More particularly, the invention relates to air starvation operation of turbocharged diesel engines.

BACKGROUND

It is known in the art relating to railway locomotives that operation at advanced throttle in long tunnels with multiple locomotive units often results in substantially increased ambient temperatures that cause the engines to lose power and operate with degraded combustion and resulting heavy smoke. To offset the power loss and maintain operator set engine speeds, the traditional speed governor control increases the fuel rate by advancing the governor or injector fuel racks. Sometimes, this further increases the smoke level without any significant increase in the engine power level. The increased ambient temperatures also reduce the cooling effect of the engine cooling system in the locomotive units which may result in engine overheating requiring engine shutdown.

SUMMARY OF THE INVENTION

The present invention results from investigations of performance of a turbocharged two cycle diesel engine of the railway locomotive type using a performance prediction model for computer use. The results indicated that operation of the engine under exhaust smoke level conditions of 60% or greater causes a power loss as fuel rate is further increased, apparently as a result of degraded combustion efficiency resulting from inlet air starvation of the engine. Thus fuel rate increases beyond the 60% exhaust smoke level apparently reduce engine power, waste fuel, increase smoke emissions and may further increase the high ambient air temperatures in the tunnel.

The present invention proposes alternate engine control methods which reduce the problems of tunnel operation by limiting engine fuel rate to lower or maintain engine power below a level at which output power is reduced when increasing the fuel rate. This control level may vary with various engine embodiments and so requires testing of the particular engine embodiment to determine the level at which the alternate control method should become effective.

One proposed alternate control method would require continuous and direct or inferred smoke level measurement. Direct measurement could involve a probe in the engine exhaust stream connected with a smokemeter that indicates the exhaust smoke level sensed by the probe. Inferred measurement could use other measured engine parameters that would be correlated by prior engine testing with a specific smoke level, such as engine air/fuel ratio and cylinder air inlet pressure and temperature. Using this smoke level measurement:

1. Engine control would be standard as long as the smoke level was below the critical value at which increased fuel rate fails to increase engine power (for example a 60% smoke level).
2. At smoke levels above the critical value, the fuel rate would be reduced until the smoke level was below the critical value (e.g. 60%). Then, while the fuel rate was reduced from the normal value for the set speed, the engine speed would be controlled by adjusting the load on the engine.

Engine load may be controlled in accordance with current practice by adjusting the field excitation of the engine driven power alternator of a diesel-electric locomotive to increase or decrease engine power.

In another proposed method, the critical value is directly determined by actual measurements of the engine power and fuel rate and monitoring the relative changes in these parameters. Such control would require the instantaneous measurement of the fuel rate which can be accomplished by available inline devices or would be included as part of engine controls for engines with electronically controlled fuel injection. Control by monitoring engine power as a function of fuel rate involves:

1. Under normal engine operation as the fuel rate is increased the engine power output increases. During this condition, normal engine control would be applied.
2. When the critical condition is reached where increases in fuel do not result in a significant increase in engine power, the engine speed would be controlled by adjusting the load on the engine.

In railroad locomotive operation, the foregoing methods would be of value primarily in tunnel operation where the following advantages are expected to result:

1. Improved pulling capacity (power);
2. Improved fuel economy;
3. Reduced particulate emissions (smoke);
4. Reduced tunnel temperatures and improved engine cooling.

These and other features and advantages of the invention will be more fully understood from the following description of certain specific embodiments of the invention taken together with the accompanying drawings.

BRIEF DRAWING DESCRIPTION

In the drawings:

FIG. 1 is a schematic diagram illustrating one method of engine speed and load control in accordance with the invention; and FIG. 2 is a schematic diagram similar to FIG. 1 but illustrating an alternative method of engine speed and load control in accordance with the invention.

DETAILED DESCRIPTION

Figure 1:
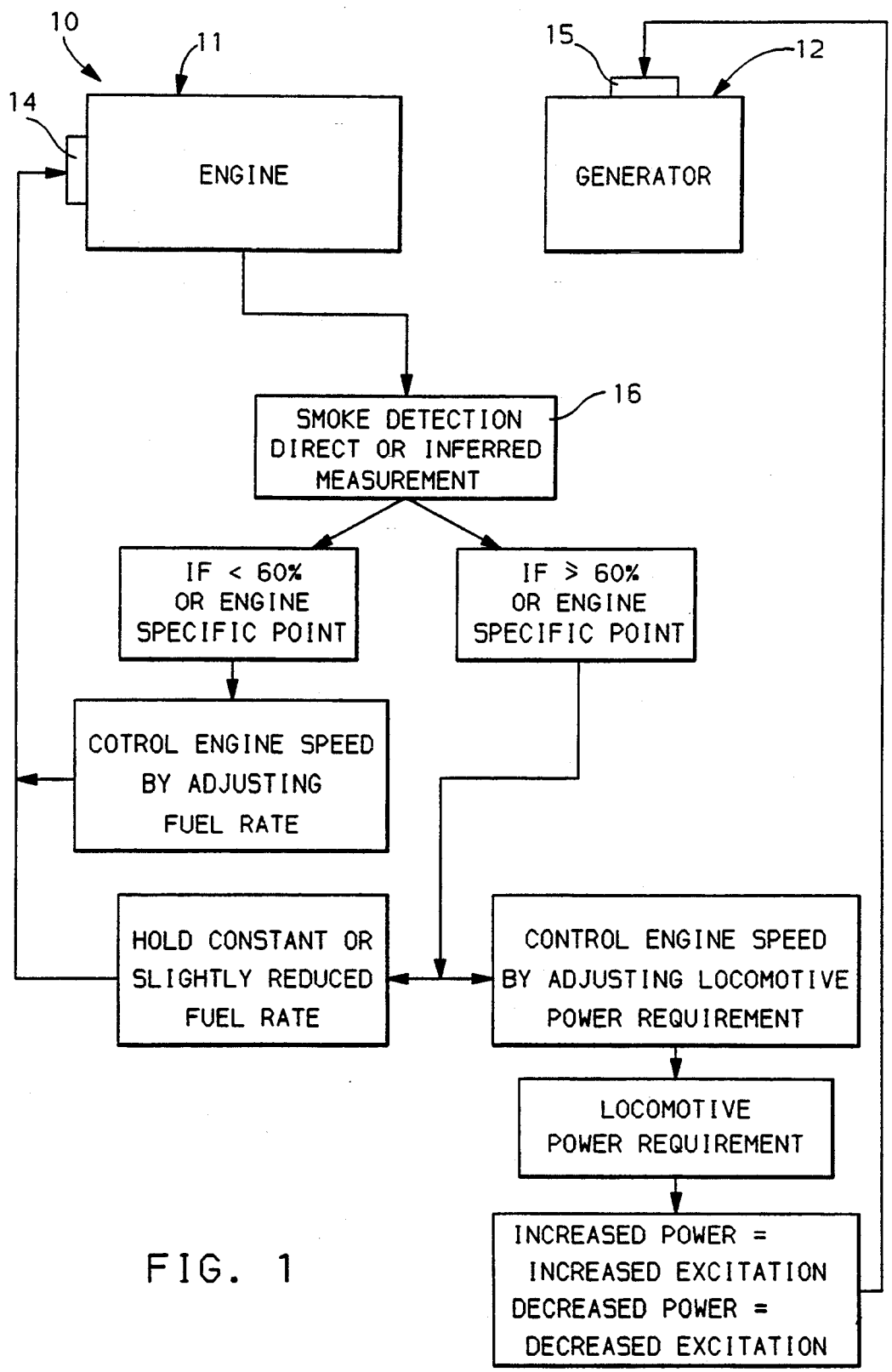

Referring now to FIG. 1 of the drawings in detail, numeral 10 generally indicates a railway diesel locomotive having a turbocharged two cycle diesel engine 11 driving a generator 12 connectable with electric traction motors (not shown) for supplying them with power to drive the locomotive. Engine 10 is provided with a speed governor 14 which normally operates to maintain a speed set by the locomotive operator by increasing or decreasing the fuel rate when the engine speed varies respectively below or above the speed setting. The generator power output is controlled by the engine speed and by a load regulator 15 which operates to increase or decrease the generator field excitation in order to respectively increase or decrease output power. The engine load varies as a function of the output power delivered by the generator.

The engine 10 is further provided with smoke detection means 16 which provide either a direct or inferred measurement of the engine exhaust smoke level. Direct detection means could be a commercial smoke detector with an exhaust probe and a readout connected with a computer programmed to operate the engine load regulator. Inferred detection means could be through measurement and computer computation of selected engine parameters which through mapping of engine operation are shown to indicate smoke level.

When a locomotive is operated under conditions of very high ambient temperature, as may occur with multiple unit freight locomotive operation in long railway tunnels, the engine air charge may be reduced, lessening available engine power. To maintain engine speed, the governor compensates by increasing the engine fuel rate. However, air starvation adversely affects engine fuel combustion causing high levels of exhaust smoke. In an engine similar to the present example, it has been indicated that when the exhaust smoke level exceeds 60 percent opacity, further increase in the engine fuel rate can actually decrease engine power output. Therefore, to avoid engine operation at smoke levels above 60 percent (or another level that may be found desirable for a particular engine) the following method illustrated in FIG. 1 may be used.

The detection means 16 are continuously operated to indicate the engine smoke level. If the smoke level remains less than 60 percent, then the governor is allowed to control engine speed in the conventional manner by adjusting the fuel rate. However, if the smoke level of 60 percent is reached or exceeded, then the governor is controlled to maintain the fuel rate constant at the current or a preestablished slightly reduced level. Meanwhile, engine speed is controlled by adjusting the locomotive power requirement which controls the load regulator to vary engine load as required to maintain the engine speed setting.

Figure 2:
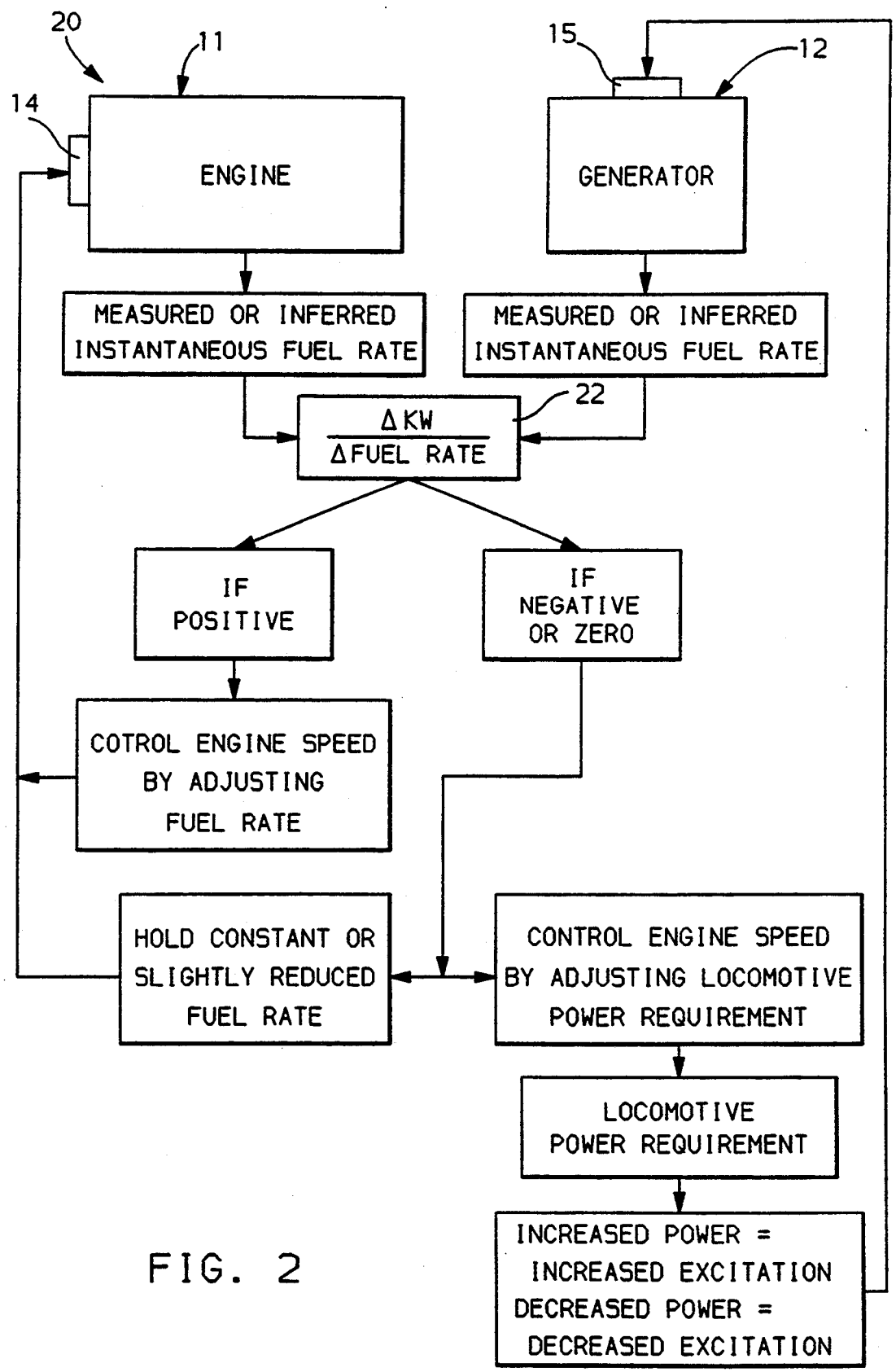

FIG. 2 illustrates an alternative control method in which the locomotive 20 includes an identical engine 11, generator 12, governor 14, and load regulator 15. However, instead of a smoke detector or indirect smoke detection means, measurements or calculations of instantaneous fuel rate and instantaneous generator power are provided to a control computer 22 which calculates a ratio of the change in power versus the change in fuel rate.

If the ratio remains positive so that increasing fuel rate continues to increase generator (engine) power, then the governor is allowed to maintain normal speed control by varying the fuel rate. However, if the ratio reaches zero or becomes negative, then the governor is controlled to hold the fuel rate constant at the current or a slightly reduced level. During this condition, the engine speed is controlled by adjusting the locomotive power requirement so that the load regulator adjusts the engine load as needed to maintain the preset speed setting.

By either of the described methods and indicated or obvious variations thereof, an engine may be controlled to avoid operation at an excessive fuel rate which fails to increase engine power. Thus improved and more efficient operation of locomotives in high temperature tunnel conditions is obtained.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A method of operating a diesel engine to accommodate engine operation under conditions of air starvation, the method comprising
    sensing a critical value of exhaust smoke at and above which increased engine fuel rate fails to significantly increase engine power,
    controlling engine speed normally by varying fuel rate whenever the exhaust smoke level is below the critical value, and
    when the exhaust smoke level is at or above the critical value, reducing the fuel rate until the smoke level is below the critical value and, while the fuel rate is reduced, controlling engine speed by adjusting the load on the engine.

2. The invention as in claim 1 wherein the step of sensing a critical value of exhaust smoke is performed by direct smoke level measurement.

3. The invention as in claim 1 wherein the step of sensing a critical value of exhaust smoke is performed by inference from other measured engine parameters.

4. A method of operating a diesel engine to accommodate engine operation under conditions of air starvation, the method comprising
    monitoring engine power as a function of engine fuel rate and determining operation in a critical condition at and above which increased engine fuel rate fails to significantly increase engine power,
    controlling engine speed normally by varying fuel rate whenever the engine is operated below the critical value, and
    controlling engine speed by adjusting the load on the engine whenever the engine is operating at or above the critical value.

5. The method of claim 4 wherein said diesel engine is a turbocharged two cycle engine.

6. A method of operating a turbocharged two cycle diesel engine to accommodate engine operation under conditions of air starvation, the method comprising
    sensing a critical value of exhaust smoke at and above which increased engine fuel rate fails to significantly increase engine power,
    controlling engine speed normally by varying fuel rate whenever the exhaust smoke level is below the critical value, and
    when the exhaust smoke level is at or above the critical value, reducing the fuel rate until the smoke level is below the critical value and, while the fuel rate is reduced, controlling engine speed by adjusting the load on the engine.

7. The invention as in claim 6 wherein the step of sensing a critical value of exhaust smoke is performed by direct smoke level measurement.

8. The invention as in claim 6 wherein the step of sensing a critical value of exhaust smoke is performed by inference from other measured engine parameters.

* * * * *